United States Patent
Bourrigaud et al.

(10) Patent No.: US 11,359,043 B2
(45) Date of Patent: Jun. 14, 2022

(54) METHOD OF PREPARATION OF A COMPOSITION COMPRISING A COPOLYMER OF METHYL METHACRYLATE AND METHACRYLIC ACID

(71) Applicant: Trinseo Europe GmbH, Horgen (CH)

(72) Inventors: Sylvain Bourrigaud, Morlanne (FR); Pierre Gerard, Lacq (FR); Daniel Callin, Caubois-Loos (FR); Gilles Meunier, Mazerolles (FR); Sylvain C. Lamarre, Mesplede (FR); Sylvain D. Queruel, Beaumont le Roger (FR)

(73) Assignee: TRINSEO EUROPE GMBH, Horgen (CH)

( * ) Notice: Subject to any disclaimer, the term of this patent is extended or adjusted under 35 U.S.C. 154(b) by 91 days.

(21) Appl. No.: 16/061,192

(22) PCT Filed: Dec. 9, 2016

(86) PCT No.: PCT/EP2016/080439
§ 371 (c)(1),
(2) Date: Jun. 11, 2018

(87) PCT Pub. No.: WO2017/097979
PCT Pub. Date: Jun. 15, 2017

(65) Prior Publication Data
US 2018/0362688 A1     Dec. 20, 2018

(30) Foreign Application Priority Data
Dec. 9, 2015 (FR) ...................................... 1562063

(51) Int. Cl.
| | | |
|---|---|---|
| C08F 220/06 | (2006.01) | |
| C08F 220/14 | (2006.01) | |
| C08F 2/02 | (2006.01) | |
| C08F 2/42 | (2006.01) | |
| C08F 6/10 | (2006.01) | |
| C08F 20/14 | (2006.01) | |
| C08F 4/36 | (2006.01) | |
| C08L 33/02 | (2006.01) | |
| C08L 33/12 | (2006.01) | |

(52) U.S. Cl.
CPC .............. *C08F 220/14* (2013.01); *C08F 2/02* (2013.01); *C08F 4/36* (2013.01); *C08F 6/10* (2013.01); *C08F 20/14* (2013.01); *C08F 220/06* (2013.01); *C08L 33/02* (2013.01); *C08L 33/12* (2013.01); *C08F 2800/20* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 6,100,355 A | 8/2000 | Relvini et al. | |
| 7,888,456 B2 | 2/2011 | Yamamoto et al. | |
| 2010/0087605 A1 | 4/2010 | Yamamoto et al. | |
| 2014/0000801 A1* | 1/2014 | Seo ................... | B29D 11/0073 156/246 |

FOREIGN PATENT DOCUMENTS

| | | | |
|---|---|---|---|
| EP | 2065410 A1 † | 6/2009 | |
| EP | 2 481 476 A1 | 8/2012 | |
| EP | 2481476 A1 † | 8/2012 | |
| GB | 1437176 | 5/1976 | |
| JP | 2008101203 A | 5/2008 | |
| JP | 2014012781 A | 1/2014 | |
| JP | 2014513324 A | 5/2014 | |
| JP | 2014111740 | 6/2014 | |
| WO | 2012141453 A2 | 10/2012 | |
| WO | 2014/007271 A1 † | 1/2014 | |
| WO | 2014007271 A1 | 1/2014 | |
| WO | WO 2014/007271 A1 | 1/2014 | |
| WO | WO-2014007271 A * | 1/2014 | ................ C08F 2/02 |

OTHER PUBLICATIONS

English-language translation of the description of WO-2014007271-A1.*
Chinese Office Action for Chinese Application No. 201680081318.4, dated Mar. 29.2021 with translation, 8 pages.
Japanese Decision of Rejection for Japanese Application No. 2018-529536, dated Apr. 13, 2021 with translation, 4 pages.
Chinese Decision on Rejection for Chinese Application No. 201680081318.4, dated Aug. 12, 2021 with translation, 8 pages.

\* cited by examiner
† cited by third party

*Primary Examiner* — Vu A Nguyen
(74) *Attorney, Agent, or Firm* — RatnerPrestia

(57) ABSTRACT

The present invention relates to a polymeric composition comprising a polymer comprising monomers of methyl methacrylate and methacrylic acid. In particular the present invention relates to a process for making a polymeric composition suitable for moulded objects, said polymeric composition is comprising monomers of methyl methacrylate and methacrylic acid. The present invention concerns also process for making a moulded object comprising a polymer comprising monomers of methyl methacrylate and methacrylic acid. The present invention concerns also moulded object comprising a polymer comprising monomers of methyl methacrylate and methacrylic acid.

15 Claims, No Drawings

METHOD OF PREPARATION OF A COMPOSITION COMPRISING A COPOLYMER OF METHYL METHACRYLATE AND METHACRYLIC ACID

This application claims benefit, under U.S.C. § 119 or § 365 of PCT Application Number PCT/EP2016/080439, filed Dec. 9, 2016, and French Patent Application Number FR1562063, filed Dec. 9, 2015, these documents being incorporated herein by reference.

FIELD OF THE INVENTION

The present invention relates to a polymeric composition comprising a polymer comprising monomers of methyl methacrylate and methacrylic acid.

In particular the present invention relates to a process for making a polymeric composition suitable for moulded objects, said polymeric composition is comprising monomers of methyl methacrylate and methacrylic acid.

The present invention concerns also process for making a moulded object comprising a polymer comprising monomers of methyl methacrylate and methacrylic acid.

The present invention concerns also moulded object comprising a polymer comprising monomers of methyl methacrylate and methacrylic acid.

Technical Problem

Thermoplastic polymers and copolymers, especially (meth)acrylic ones, have excellent characteristics such as transparency, mechanical properties and processability and are widely used in various fields such as automobile parts, electrical parts, industrial parts, optical materials, various parts of household electrical appliances, aesthetical parts, miscellaneous goods and the like.

It is of great interest to have polymeric compositions base on (meth)acrylic polymers that have sufficient thermic properties in these fields or in other words an increased heat resistance or vicat temperature. This has been achieved by copolymerization with specific comonomers.

Additionally it is of also of great interest to have a polymeric composition with better optical properties, especially after thermal aging, and a process for making such polymeric composition.

The objective of the present invention is to provide a process for producing a (meth)acrylic polymer composition with good heat resistance.

A further objective of the present invention is to provide a process for producing a (meth)acrylic polymer composition with good optical properties and surface properties.

A still further objective of the present invention is to provide a process for producing a (meth)acrylic polymer composition with a high conversion of the monomer. Conversion should be at least 40% of the monomer or monomers, preferably at least 50%.

A still further objective of the present invention is to provide a process for producing a (meth)acrylic polymer composition with good heat resistance that can be easily transformed and molded or extruded.

Another objective of the present invention is to provide a process for making a moulded or extruded objects that comprises a (meth)acrylic polymer composition with good heat resistance.

Another objective of the present invention is to provide a process for producing a (meth)acrylic polymer composition with good thermal aging in view of optical properties.

According to the present invention, there is provided a novel process for producing a polymer composition which is able to more efficiently produce the polymer composition with high quality, more specifically, a polymer composition having high heat stability and satisfying optical properties.

BACKGROUND OF THE INVENTION

Prior Art

The document GB1437176 discloses acrylic copolymers. Several copolymers are disclosed including copolymers of methyl methacrylate and methacrylic acid. The copolymers are made by a suspension process.

The document EP0774471 discloses a process for acrylic suspension polymerization with partially hydrosoluble comonomers. The process uses water and a suspending agent.

The document EP 2065410 discloses a process for the production of thermoplastic copolymer. The thermoplastic copolymer comprises a comonomer coming from an unsatured carboxylic acid.

The document US2014/0000801 discloses a method of preparing resin composition for optical film using continuous bulk polymerization. The polymerization as disclosed in the examples is a solution polymerization.

The prior art discloses a process for preparation of a polymeric composition comprising a (meth)acrylic copolymer comprising monomers of methyl methacrylate and methacrylic acid by a suspension process or with a different composition or different process parameters.

BRIEF DESCRIPTION OF THE INVENTION

Surprisingly it has been discovered that process of preparation of a polymeric composition suitable for making moulded objects said composition comprising a (meth)acrylic copolymer comprising monomers of methyl methacrylate and methacrylic acid said process comprises the steps of
  a) adding a monomer mixture comprising at least 80 wt % of methyl methacrylate and comprising also methacrylic acid to a reaction vessel
  b) adding an initiator
  c) adding a chain transfer agent
  d) polymerizing the monomer mixture
  e) recover a composition from the reaction vessel comprising between 40 wt % and 80 wt % of the (meth)acrylic copolymer, yields to a (meth)acrylic copolymer having increased heat resistance and better optical properties, especially after thermal aging.

It has also been found that a composition obtained by a process of preparation of a polymeric composition suitable for making moulded objects said composition comprising a (meth)acrylic copolymer comprising monomers of methyl methacrylate and methacrylic acid said process comprises the steps of
  a) adding a monomer mixture comprising at least 80 wt % of methyl methacrylate and comprising also methacrylic acid to a reaction vessel
  b) adding an initiator
  c) adding a chain transfer agent
  d) polymerizing the monomer mixture e) recover a composition from the reaction vessel comprising
between 40 wt % and 80 wt % of the (meth)acrylic copolymer; can be used for making a moulded object having increased heat resistance and better optical properties, especially after thermal aging.

It has also been found that moulded object comprising a composition obtained by a process of preparation of a polymeric composition suitable for making moulded objects said composition comprising a (meth)acrylic copolymer comprising monomers of methyl methacrylate and methacrylic acid said process comprises the steps of
a) adding a monomer mixture comprising at least 80 wt % of methyl methacrylate and comprising also methacrylic acid to a reaction vessel
b) adding an initiator
c) adding a chain transfer agent
d) polymerizing the monomer mixture
e) recover a composition from the reaction vessel comprising between 40 wt % and 80 wt % of the (meth) acrylic copolymer; possesses increased heat resistance and better optical properties, especially after thermal aging.

DETAILED DESCRIPTION OF THE INVENTION

According to a first aspect, the present invention relates to process of preparation of a polymeric composition suitable for making moulded objects said composition comprising a (meth)acrylic copolymer comprising monomers of methyl methacrylate and methacrylic acid said process comprises the steps of
a) adding a monomer mixture comprising at least 80 wt % of methyl methacrylate and comprising also methacrylic acid to a reaction vessel
b) adding an initiator
c) adding a chain transfer agent
d) polymerizing the monomer mixture
e) recover a composition from the reaction vessel comprising between 40 wt % and 80 wt % of the (meth) acrylic copolymer.

According to another aspect the present invention relates to the use of a composition obtained by a process of preparation of a polymeric composition suitable for making moulded objects said composition comprising a (meth) acrylic copolymer comprising monomers of methyl methacrylate and methacrylic acid said process comprises the steps of
a) adding a monomer mixture comprising at least 80 wt % of methyl methacrylate and comprising also methacrylic acid to a reaction vessel
b) adding an initiator
c) adding a chain transfer agent
d) polymerizing the monomer mixture
e) recover a composition from the reaction vessel comprising
between 40 wt % and 80 wt % of the (meth)acrylic copolymer; for making a moulded object.

Still another aspect of the present invention is a moulded object made of a polymeric composition obtained by a process of preparation of a polymeric composition suitable for making moulded objects said composition comprising a (meth)acrylic copolymer comprising monomers of methyl methacrylate and methacrylic acid said process comprises the steps of
a) adding a monomer mixture comprising at least 80 wt % of methyl methacrylate and comprising also methacrylic acid to a reaction vessel
b) adding an initiator
c) adding a chain transfer agent
d) polymerizing the monomer mixture
e) recover a composition from the reaction vessel comprising between 40 wt % and 80 wt % of the (meth) acrylic copolymer.

An additional aspect of the present invention is the process for making a moulded object by transforming a polymeric composition obtained by a process of preparation of a polymeric composition suitable for making moulded objects said composition comprising a (meth)acrylic copolymer comprising monomers of methyl methacrylate and methacrylic acid said latter process comprises the steps of
a) adding a monomer mixture comprising at least 80 wt % of methyl methacrylate and comprising also methacrylic acid to a reaction vessel
b) adding an initiator
c) adding a chain transfer agent
d) polymerizing the monomer mixture
e) recover a composition from the reaction vessel comprising between 40 wt % and 80 wt % of the (meth) acrylic copolymer.

By the term "alkyl(meth)acrylate" as used is denoted to both alkyl acrylate and alkyl methacrylate.

By the term "copolymer" as used is denoted that the polymers consists of at least two different monomers.

By the term "parts" as used herein is denoted "parts by weight".

By the term "thermoplastic polymer" as used is denoted a polymer that turns to a liquid or becomes more liquid or less viscous when heated and that can take on new shapes by the application of heat and pressure.

By the term "PMMA" as used in the present invention are denoted copolymers of methylmethacrylate (MMA), for the copolymer of MMA the weight ratio of MMA inside the PMMA is at least 80 wt %.

With regard to the process for the preparation of a polymeric composition suitable for making moulded objects said composition comprising a (meth)acrylic copolymer comprising monomers of methyl methacrylate and methacrylic acid said process is a bulk polymerization.

Preferably the process is a continuous bulk polymerization.

Preferably the process for the preparation of a polymeric composition suitable for making moulded objects said composition comprising a (meth)acrylic copolymer comprising monomers of methyl methacrylate and methacrylic acid comprises also at least one of the following steps
devolatilization of the composition recovers in step e);
recycling of at least of a part of the non-reacted monomer(s);
cooling of monomer mixture comprising at least 80 wt % of methyl methacrylate and comprising also methacrylic acid to a temperature below −0° C. before the adding to the reaction vessel;
keeping the temperature inside the reaction vessel at a temperature between 120° C. and 180° C.

Preferably the devolatilization step is made with a devolatilization extruder.

Preferably at least 10 wt % of the non-reacted monomer(s) is/are recycled. Recycled means that the non-reacted monomer(s) is either conducted into monomer distillation or into the reaction vessel. More preferably at least 20 wt % of the non-reacted monomer(s), still more preferably at least 30 wt %, advantageously at least 40 wt %, more advantageously at least 50 wt % and still more advantageously at least 60% are recycled.

Preferably the monomer mixture comprising at least 80 wt % of methyl methacrylate and comprising also methacrylic acid is cooled to a temperature below 0° C., preferably below −10° C., more preferably below −20° C., even more preferably below −25° C., most preferably below −30° C. and advantageously below −35° C. before the adding of the monomer mixture to the reaction vessel, in step a) of the process according to the invention.

Preferably the monomer mixture comprising at least 80 wt % of methyl methacrylate and comprising also methacrylic acid is cooled to a temperature above −50° C., preferably above −48° C., more preferably above −47° C., even more preferably above −46° C., most preferably above −45° C. and advantageously above −44° C. before the adding of the monomer mixture to the reaction vessel, in step a) of the process according to the invention.

Advantageously the monomer mixture comprising at least 80 wt % of methyl methacrylate and comprising also methacrylic acid is cooled to a temperature between −50° C. and 0° C., preferably between −48° C. and −10° C., more preferably between −47° C. and −20° C., even more preferably between −46° C. and −25° C., most preferably between 45° C. and −30° C. and advantageously between −44° C. and −35° C. before the adding of the monomer mixture to the reaction vessel, in step a) of the process according to the invention.

Preferably the temperature inside the reaction vessel is kept at a temperature between 125° C. and 175° C. This temperature is the temperature during the polymerization.

More preferably the difference of the temperature between the temperature inside the reaction vessel during polymerization and the temperature monomer mixture comprising at least 80 wt % of methyl methacrylate and comprising also methacrylic acid that is added to the reaction vessel and is at least 120K, preferably at least 125K, more preferably at least 130K, still more preferably at least 135K, advantageously at least 140K, and more advantageously at least 145K, still more advantageously at least 150K and most advantageously at least 155K.

The process for the preparation of a polymeric composition suitable for making moulded objects said composition comprising a (meth)acrylic copolymer comprising monomers of methyl methacrylate and methacrylic acid said method comprising also the steps of:
continuously adding the monomer mixture and a polymerization initiator and the chain transfer agent to the reaction vessel;
controlling the adding flow rate of the of the monomer mixture and/or the polymerization initiator and/or the chain transfer agent to the reaction vessel.

The process also comprises an apparatus to conduct the process of the present invention.

The apparatus for the polymerization in the present invention may be a bulk-polymerizing apparatus or a continuously bulk-polymerizing apparatus.

Preferably the apparatus for the polymerization in the present invention is a continuously bulk-polymerizing apparatus.

The apparatus comprises
a reaction vessel;
a means for adding the monomer mixture to the reaction vessel;
a means for adding a polymerization initiator to the reaction vessel;
a means for adding a chain transfer agent to the reaction vessel;
a means for detecting a temperature in the reaction vessel;
a means for regulating a temperature of an outer wall surface of the reaction vessel
a means for recover a composition from the reaction vessel comprising between 40 wt % and 80 wt % of the (meth)acrylic copolymer.

The apparatus preferably comprises also a means for controlling the adding flow rate of the monomer mixture and/or the polymerization initiator and/or the chain transfer agent to the reaction vessel by the monomer mixture adding means and/or the initiator adding means and/or the chain transfer agent adding means.

Preferably the reaction vessel is a continuous stirred tank reactor.

The composition recovered from the continuous stirred tank reactor comprises unreacted raw material as monomer mixture and polymerization initiator and so on, in addition to the generated (meth)acrylic copolymer. This composition is preferably subjected to, for example, devolatilization to separate and recover the raw material monomer mixture, by means of a devolatilizing extruder.

Preferably the monomer mixture added to the reaction vessel comprises at least 80 wt %, more preferably at least 85 wt %, even more preferably at least 90 wt % of methyl methacrylate and most preferably at least 92 wt % of methyl methacrylate.

More preferably the monomer mixture added to the reaction vessel comprises between 80 wt % and 99 wt % of methyl methacrylate and 1 wt % and 20 wt % of methacrylic acid, still more preferably between 85 wt % and 98 wt % of methyl methacrylate and 2 wt % and 15 wt % of methacrylic acid, most preferably between 90 wt % and 98 wt % of methyl methacrylate and 2 wt % and 10 wt % of methacrylic acid and most preferably between 92 wt % and 97 wt % of methyl methacrylate and 3 wt % and 8 wt % of methacrylic acid.

Preferably the (meth)acrylic copolymer recovered from the reaction vessel comprises at least 80 wt % of monomers in the polymeric chain coming from methyl methacrylate, more preferably at least 85 wt % of monomers in the polymeric chain coming from methyl methacrylate, still more preferably at least 90 wt % of monomers in the polymeric chain coming from methyl methacrylate and most preferably at least 92 wt % of monomers in the polymeric chain coming from methyl methacrylate.

The composition recovered from the reaction vessel comprises between 40 wt % and 80 wt % of the (meth)acrylic copolymer, more preferably between 45 wt % and 70 wt %, advantageously between 50 wt % and 70 wt % and more advantageously between 55 wt % and 70 wt % of the (meth)acrylic copolymer.

The composition recovered from the reaction vessel comprises between 20 wt % and 60 wt % of unreacted monomer from the monomer mixture added and other residues coming from initiator and chain transfer agent, preferably between 25 wt % and 60 wt %, more preferably between 30 wt % and 55 wt %, advantageously between 30 wt % and 50 wt %, and more advantageously between 30 wt % and 45 wt % of unreacted monomer from the monomer mixture added and other residues coming from initiator and chain transfer agent.

Preferably the composition recovered from the reaction vessel comprises between 40 wt % and 75 wt % of the (meth)acrylic copolymer and between 25 wt % and 60 wt % of unreacted monomer from the monomer mixture added and other residues coming from initiator and chain transfer agent, more preferably between 45 wt % and 70 wt % of the (meth)acrylic copolymer and between 30 wt % and 55 wt % of unreacted monomer from the monomer mixture added and other residues coming from initiator and chain transfer agent, advantageously between 50 wt % and 70 wt % of the (meth)acrylic copolymer and between 30 wt % and 50 wt % of unreacted monomer from the monomer mixture added and other residues coming from initiator and chain transfer agent and more advantageously between 55 wt % and 70 wt % of the (meth)acrylic copolymer and between 30 wt % and 45 wt % of unreacted monomer from the monomer mixture added and other residues coming from initiator and chain transfer agent.

Preferably at least 40%, more preferably at least 50% of methyl methacrylate of the monomer mixture are converted to the (meth)acrylic copolymer.

More preferably the (meth)acrylic copolymer recovered with the composition from the reaction vessel comprises between 80 wt % and 99 wt % of methyl methacrylate and 1 wt % and 20 wt % of monomer units based on the introduction of methacrylic acid with the monomer mixture, more preferably between 85 wt % and 98 wt % of methyl methacrylate and 2 wt % and 15 wt % of monomer units based on the introduction of methacrylic acid with the monomer mixture, still more preferably between 90 wt % and 98 wt % of methyl methacrylate and 2 wt % and 10 wt % of monomer units based on the introduction of methacrylic acid with the monomer mixture and most preferably between 92 wt % and 97 wt % of methyl methacrylate and 3 wt % and 8 wt % of monomer units based on the introduction of methacrylic acid with the monomer mixture.

By monomers units based on the introduction of methacrylic acid with the monomer mixture is meant that after the copolymerization of the methacrylic group of the methacrylic acid for forming the main chain, the carboxylic acid group could react further. Either the carboxylic acid group of the copolymerized methacrylic acid is still present as lateral group in the polymer chain of for example two carboxylic acid groups could have formed an anhydride.

In a first advantageously embodiment the monomer mixture added to the reaction vessel consists of between 85 wt % and 99 wt % of methyl methacrylate and 1 wt % and 15 wt % of methacrylic acid, more preferably between 90 wt % and 98 wt % of methyl methacrylate and 2 wt % and 10 wt % of methacrylic acid and most preferably between 92 wt % and 97 wt % of methyl methacrylate and 3 wt % and 8 wt % of methacrylic acid.

In the first advantageously embodiment the (meth)acrylic copolymer recovered with the composition from the reaction vessel consists of between 85 wt % and 99 wt % of methyl methacrylate and 1 wt % and 15 wt % of monomer units based on the introduction of methacrylic acid with the monomer mixture, more preferably between 90 wt % and 98 wt % of methyl methacrylate and 2 wt % and 10 wt % of monomer units based on the introduction of methacrylic acid with the monomer mixture and most preferably between 92 wt % and 97 wt % of methyl methacrylate and 3 wt % and 8 wt % of monomer units based on the introduction of methacrylic acid with the monomer mixture.

In a second advantageously embodiment the monomer mixture added to the reaction vessel comprises between 80 wt % and 98 wt % of methyl methacrylate, 1 wt % and 19 wt % of methacrylic acid and at least one third monomer, more preferably between 85 wt % and 97 wt % of methyl methacrylate and 2 wt % and 14 wt % of methacrylic acid and at least one third monomer and most preferably between 88 wt % and 96 wt % of methyl methacrylate and 3 wt % and 11 wt % of methacrylic acid and at least one third monomer.

In the second advantageously embodiment the (meth)acrylic copolymer recovered with the composition from the reaction vessel comprises between 80 wt % and 98 wt % of methyl methacrylate and 1 wt % and 19 wt % of monomer units based on the introduction of methacrylic acid with the monomer mixture and at least one third monomer, more preferably between 85 wt % and 97 wt % of methyl methacrylate and 2 wt % and 14 wt % of monomer units based on the introduction of methacrylic acid with the monomer mixture and at least one third monomer and most preferably between 88 wt % and 96 wt % of methyl methacrylate and 3 wt % and 11 wt % of monomer units based on the introduction of methacrylic acid with the monomer mixture and at least one third monomer.

The third monomer is copolymerizable with methyl methacrylate and methacrylic acid. The third monomer comprises an unsaturated carbon double bond of type: $CH_2=CR_1R_2$. With $R_1$ representing and alkyl group or hydrogen and $R_2$ representing an organic rest.

With regard to the initiator of the process for making composition according to the invention, it is a radical initiator, preferably a free radical type of initiator.

More preferably the initiator is of azo type, peroxide or hydroperoxide.

Examples of the above-mentioned radical initiator include azo compounds such as azobisisobutyronitrile, azobisdimethylvaleronitrile, azobiscyclohexanenitrile, 1,1'-azobis(1-acetoxy-1-phenylethane), dimethyl2,2'-azobisisobutyrate and 4,4'-azobis-4-cyanovaleric acid; and organic peroxides such as benzoyl peroxide, lauroyl peroxide, acetyl peroxide, caprylyl peroxide, 2,4-dichlorbenzoyl peroxide, isobutyl peroxide, acetylcyclohexylsulfonyl peroxide, tert-butyl peroxypivalate, tert-butyl peroxy-2-ethyl hexanoate, 1,1-di-tert-butyl peroxycyclohexane, 1,1-di-tert-butyl peroxy-3,3,5-trimethylcyclohexane, 1,1-di-tert-hexyl peroxy-3,3,5-trimethylcyclohexane, isopropyl peroxydicarbonate, isobutyl peroxydicarbonate, sec-butyl peroxydicarbonate, n-butyl peroxydicarbonate, 2-ethylhexyl peroxydicarbonate, bis(4-tert-butylcyclohexyl)peroxydicarbonate, tert-amyl peroxy-2-ethyl hexanoate, 1,1,3,3-tetramethylbutyl peroxyethyl hexanoate, 1,1,2-trimethylpropyl peroxy-2-ethyl hexanoate, tert-butyl peroxyisopropyl monocarbonate, tert-amyl peroxyisopropyl monocarbonate, tert-butyl peroxy-2-ethylhexyl carbonate, tert-butyl peroxyallyl carbonate, tert-butyl peroxyisopropyl carbonate, 1,1,3,3-tetramethylbutyl peroxyisopropyl monocarbonate, 1,1,2-trimethylpropyl peroxyisopropyl monocarbonate, 1,1,3,3-tetramethylbutyl peroxyisononanoate, 1,1,2-trimethylpropyl peroxyisononanoate, 1,1-Bis(tert-amylperoxy)cyclohexane and tert-butyl peroxybenzoate. These radical initiators may be used singly in one kind or may be used in a mixture of two or more kinds of them.

The amount of the radical initiator to be used is not particularly limited, and may be 0.001 percent by weight to 1 percent by weight with respect to the monomer mixture.

With regard to the chain transfer agent or chain regulator of the process for making composition according to the invention, it is a sulphur containing organic compound, in order to adjust the molecular weight of the polymer to be produced by the process.

The chain transfer agent is chosen from mercaptans.

The chain transfer agent may be either of monofunctional and multifunctional chain transfer agents, and specific examples thereof include alkyl mercaptans such as propyl mercaptan, butyl mercaptan, hexyl mercaptan, octyl mercaptan, 2-ethylhexyl mercaptan and dodecyl mercaptan; aromatic mercaptans such as phenyl mercaptan and thiocresol; mercaptans with a carbon number of 18 or less such as ethylene thioglycol; polyhydric alcohols such as ethylene glycol, neopentyl glycol, trimethylolpropane, pentaerythritol, dipentaerythritol, tripentaerythritol and sorbitol; esterified substance of a hydroxyl group with thioglycolic acid or 3-mercaptopropionic acid, 1,4-dihydronaphthalene, 1,4,5,8-tetrahydronaphthalene, and #x3B2;-terpinene, terpinolene, 1,4-cyclohexadiene, 1,4cyclohexadiene, and hydrogen sulfide. These may be used in a simple substance or in a combination of two kinds or more.

The amount of the chain transfer agent is not particularly limited and varies depending on kinds of the chain transfer agent to be used. For example, in the case of using mercaptans as the chain transfer agent, the amount is preferably 0.01 part by weight to 3 parts by weight, more preferably 0.05 part by weight to 1 part by weight with respect to 100 parts by weight of the monomer mixture.

A thermal stabilizing agent for suppressing thermal decomposition of the (meth) copolymer can be added with the other raw materials, especially the monomer mixture into the process. More preferably, the content ratio of the thermal stabilizing agent is between 1 ppm and 2000 ppm by weight with respect to the total amount of the final methacrylic copolymer composition obtained by the process. When the methacrylic resin composition of the present invention is subjected to injection molding so as to mold it into a light guide plate as desired, a molding temperature is set at a higher temperature for the purpose of increasing a molding efficiency in some cases, and addition of the thermal stabilizing agent in these cases contributes to such effect.

With regard to the thermal stabilizing agent, there are no specific limitations, but a phosphorus thermal stabilizing agent and an organic disulfide compound are mentioned, exemplarily. Among them, the organic disulfide compound is preferred. As the thermal stabilizing agent, one kind or more than one kind thereof may be used.

As the above-described phosphorus thermal stabilizing agent, examples are tris(2,4-di-t-butylphenyl)phosphite, 2-[[2,4,8,10-tetrakis(1,1-dimethylethyl)dibenzo [d,f][1,3,2]dioxaphosphepine-6-yl]oxy]-N,N-bis [2-[[2,4,8,10-tetrakis(1,1-dimethylethyl)dibenzo [d,f][1,3,2]dioxaphosphepine-6-yl]oxy]-ethyl]ethanamine, diphenyl tridecyl phosphite, triphenyl phosphite, 2,2-methylenebis(4,6-di-tert-butylphenyl)octylphosphite, bis(2,6-di-tert-butyl-4-methylphenyl) pentaerythritol diphosphite, and so on. Among them, 2,2-methylenebis(4,6-di-tert-butylphenyl)octylphosphite is preferred.

As the above-described organic disulfide compound, examples are dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide, di-tert-dodecyl disulfide, and so on. Among them, di-tert-alkyl disulfide is preferred, and di-tert-dodecyl disulfide is more preferred.

Preferably the polymerization is carried out in the absence of any voluntary added solvent or dispersant. The liquid monomers of the monomer mixture are not considered as added solvents or dispersants.

According to a further aspect the present invention concerns a process for making a moulded object by transforming a polymeric composition obtained by the process of preparation of a polymeric composition suitable for making moulded objects.

The transformation can be made by injection molding, extrusion, coextrusion or extrusion/blow molding. Preferably the transformation is made by injection or extrusion and more preferably by injection moulding.

The process for making a moulded object according to the invention comprises the steps of
melting the composition comprising a (meth)acrylic copolymer produced by the process of the present invention
injecting the molten composition into a mould
applying pressure to the mould at least until the mould is completely filled with the molten composition.

According to a still further aspect the present invention concerns the use of the composition for making a moulded object said composition is obtained by a process the process of preparation of a polymeric composition suitable for making moulded objects or articles.

The polymer composition produced by the process of the present invention is preferably used as a material for a moulded article, and the molded article obtained therefrom has an advantage of showing high heat resistance and heat stability. For example, the polymer composition produced by the process of the present invention (more specifically, the methacrylic copolymer composition after devolatilization; is molded alone or together with any suitable other component(s) according to any molding process such as injection molding and extrusion molding to prepare a molded article.

The composition according to the invention can be transformed by injection molding, extrusion, coextrusion or extrusion/blow molding for the preparation of parts, profiled elements, sheets or films, for example, or for producing a moulded object or an article.

The composition obtained by the process according to the invention can be used for making an article or be used to be part of an article.

The composition obtained by the process according to the invention can be used to be transformed directly into an article or object or can be part of an article or object.

According to a still further aspect the present invention concerns a moulded object made of a polymeric composition obtained by a process according to the present invention.

The moulded object of the invention can be in form of a sheet, block, film, tube or profiled element.

Examples for moulded objects or articles are light guides, lenses, automotive trims, parts of automotive rear and front lights, tail light, front covers, clusters, oven covers, home appliance parts, optical films, decorative films, capstock layers.

METHODS

The optical properties of the polymers are measured according to following method: light transmittance and haze are measured according to the standard ASTM D1003; while the yellow index is measured according to ASTM E313.

The vicat temperature of the polymers are measured according to norm ISO 306 method B50.

The aging of the polymer samples. The polymer composition is transformed in sheet samples with a dimension of 100 mm*100 mm*3 mm.

Samples are introduced in a hermitically closed recipient which contains as well a small bowl of water and then heated to 80° C. in an oven.

Results are given by heating the samples at 120° C. and 150° C. respectively in a ventilated oven.

EXAMPLES

The series of examples concern the preparation of copolymers by different processes.

Example 1

Methyl methacrylate (95 wt %) is polymerized in the presence of methacrylic acid (5 wt %) by a continuous bulk or mass polymerization process. The process uses relatively towards 100 parts by weight of monomers: an initiator (290 ppm of 1,1-Bis(tert-amylperoxy)cyclohexane (Luperox 531) 60% pure), as well as a 3300 ppm of chain regulator (dodecylmercaptan) and 50 ppm of a thermal stabilizing agent (DTDDS). The reaction mixture is cooled down to −40° C. and introduced in CSTR (continuous stirred tank reactor) reactor. The temperature increases to 160° C. due to the enthalpy generated of the polymerization. The product is recovered from the reactor at a conversion of 50% to 60% (polymer in the monomer). The mixture of polymer and monomer is heated up to 200° C. to 230° C. and is introduced in a degasing extruder for devolatization. A copolymer COPO1 of methyl methacrylate with methacrylic acid is obtained.

Comparative Example 1

A copolymer COPO2 is prepared by suspension polymerization according to the document EP0774471 example 4, while using a mixture comprising 95.5 wt % of methyl methacrylate, 4.5 wt % of methacrylic acid, the two monomers together make up 100 parts by weight, and 0.26 parts by weight of chain regulator, 0.005 parts by weight of DTDDS and as last ingrededient 0.225 parts by weight of t-butyl peroxy-2-ethylhexanoate (Luperox® 26 from ARKEMA).

TABLE 1 comparison of aging of example 1 and comparative example 1 at 80° C. under humid atmosphere

| Temperature [° C.] | Time [hours] | Example 1 Copo 1 Yellow index | Comparative example 1 Copo 2 Yellow index |
| --- | --- | --- | --- |
|  | 0 | 0.12 | 0.47 |
|  | 24 | 0.14 | 0.45 |
|  | 168 | 0.20 | 0.65 |

The moulded samples transformed from the polymer composition prepared according to the process of the invention possess always a yellow index that is inferior.

TABLE 2 comparison of aging of example 1 and comparative example 1 at 120° C. and 150° C.

| Temperature [° C.] | Time [min] | Example 1 Copo 1 Yellow index | Comparative example 1 Copo 2 Yellow index |
| --- | --- | --- | --- |
| 120 | 0 | 0.12 | 0.47 |
|  | 30 | 0.06 | 0.46 |
|  | 90 | 0.14 | 0.55 |
|  | 150 | 0.21 | 0.58 |

TABLE 2-continued comparison of aging of example 1 and comparative example 1 at 120° C. and 150° C.

| Temperature [° C.] | Time [min] | Example 1 Copo 1 Yellow index | Comparative example 1 Copo 2 Yellow index |
| --- | --- | --- | --- |
| 150 | 0 | 0.12 | 0.47 |
|  | 30 | 0.16 | 0.63 |
|  | 90 | 0.16 | 0.75 |
|  | 150 | 0.28 | 0.97 |

The invention claimed is:

1. A process of preparation of a polymeric composition suitable for making molded objects, said composition comprising a (meth)acrylic copolymer comprising monomers of methyl methacrylate and methacrylic acid, said process comprises the steps of
   a) adding a monomer mixture consisting essentially of between 85 wt % and 99 wt % of methyl methacrylate and between 1 wt % and 15 wt % of methacrylic acid to a reaction vessel after cooling said monomer mixture to a temperature between −47° C. and −20° C. before the adding to the reaction vessel;
   b) adding an initiator;
   c) adding a chain transfer agent;
   d) polymerizing the monomer mixture in the absence of any voluntary added solvent or dispersant; and
   recovering a composition from the reaction vessel comprising between 45 wt % and 70 wt % of the (meth) acrylic copolymer, wherein the composition recovered comprises between 30 wt % and 50 wt % of unreacted monomer from the monomer mixture added and other residues coming from initiator and chain transfer agent,
   while keeping the temperature inside the reaction vessel at a temperature between 125° C. and 175° C. wherein the difference between the temperature inside the reaction vessel and the temperature of monomer mixture that is added to the reaction vessel is at least 145K.

2. The process according to claim 1, wherein said polymerization step is a continuous bulk polymerization.

3. The process according to claim 1, comprising additionally at least one of the following steps
   devolatilization of the composition recovered in step e);
   recycling of at least of a part of the non-reacted monomer(s).

4. The process according to claim 1 wherein the monomer mixture consisting essentially of between 85 wt % and 99 wt % of methyl methacrylate and between 1 wt % and 15 wt % of methacrylic acid is cooled to a temperature of from −47° C. to −25° C. before the adding of the monomer mixture to the reaction vessel.

5. The process according to claim 1, wherein the monomer mixture consisting essentially of between 85 wt % and 99 wt % of methyl methacrylate and between 1 wt % and 15 wt % of methacrylic acid is cooled to a temperature between −44° C. and −35° C., before the adding of the monomer mixture to the reaction vessel, in step a) of the process.

6. The process according to claim 1, wherein the monomer mixture consisting essentially of between 85 wt % and 99 wt % of methyl methacrylate and between 1 wt % and 15 wt % of methacrylic acid is cooled to a temperature between −45° C. and −30° C. before the adding of the monomer mixture to the reaction vessel, in step a) of the process.

7. The process according to claim 1, wherein the difference between the temperature inside the reaction vessel and the temperature of the monomer mixture consisting essentially of between 85 wt % and 99 wt % of methyl methacrylate and 1 wt % and 15 wt % of methacrylic acid that is added to the reaction vessel is at least 155K.

8. The process according to claim 1, wherein the reaction vessel is a continuous stirred tank reactor.

9. The process according to claim 1, wherein the composition recovered from the reaction vessel comprises between 50 wt % and 70 wt % of the (meth)acrylic copolymer.

10. The process according to claim 1, wherein the monomer mixture comprises at least 90 wt % of methyl methacrylate.

11. The process according to claim 1 wherein (meth) acrylic copolymer recovered comprises at least 85 wt % of methyl methacrylate.

12. The process according to claim 1, wherein the monomer mixture added consists essentially of between 90 wt % and 98 wt % of methyl methacrylate and 2 wt % and 10 wt % of methacrylic acid.

13. The process of preparation of a polymeric composition according to claim 1, wherein the (meth)acrylic copolymer recovered comprises at least 90 wt % of methyl methacrylate.

14. The process of preparation of a polymeric composition according to claim 1 wherein the (meth)acrylic copolymer consists of between 90 wt % to 98 wt % of methyl methacrylate and 2 wt % to 10 wt % of monomer units based on the introduction of methacrylic acid with the monomer mixture.

15. The process according to claim 3, wherein at least 10 wt % of the non-reacted monomer(s) is/are recycled by either conducting the non-reacted monomer into the monomer distillation or into the reaction vessel.

* * * * *